United States Patent [19]

Runkle et al.

[11] 3,825,090

[45] July 23, 1974

[54] ROTARY ENGINE AND TRANSMISSION ASSEMBLY MOUNTING SYSTEM

[75] Inventors: Donald L. Runkle, Royal Oak; Charles N. Hughes, Milford, both of Mich.

[73] Assignee: General Motors Corporation, Detroit, Mich.

[22] Filed: Aug. 8, 1973

[21] Appl. No.: 386,513

[52] U.S. Cl. .................... 180/64 R, 248/7, 248/8
[51] Int. Cl. ............................................. B60k 5/12
[58] Field of Search ............. 180/64 R; 248/3, 6, 7, 248/8, 9, 10, 15, 22

[56] References Cited
UNITED STATES PATENTS 2,289,781  12/1966  Ferguson ........................ 248/8 X
3,191,710  6/1965  Reynolds .......................... 248/8 X
3,402,782  9/1968  Ljungstrom ..................... 180/64 R Primary Examiner—Lloyd L. King
Assistant Examiner—Randolph A. Reese
Attorney, Agent, or Firm—Ronald L. Phillips

[57] ABSTRACT

A rotary engine and transmission assembly mounting system having a pair of elastomeric mounts secured to the vehicle structure and the bottom of the rotary engine and transmission assembly for controlling vertical, lateral, and fore-aft movements and also yaw, pitch and roll of the engine and transmission assembly and an additional elastomeric mount including a strut for controlling only lateral movement, yaw and roll of the engine and transmission assembly.

4 Claims, 10 Drawing Figures

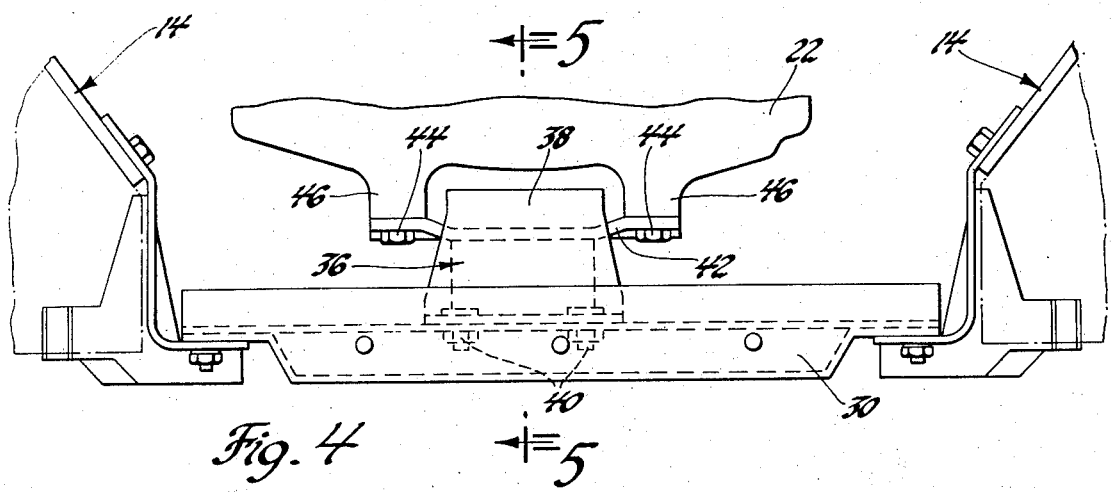
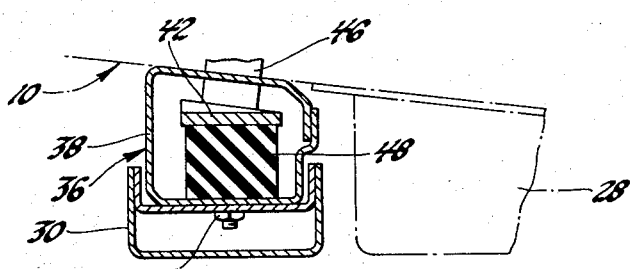
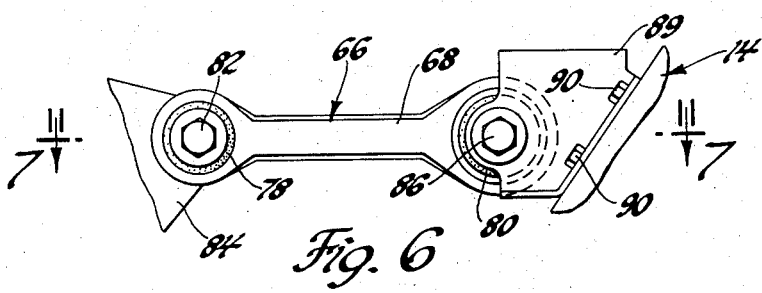
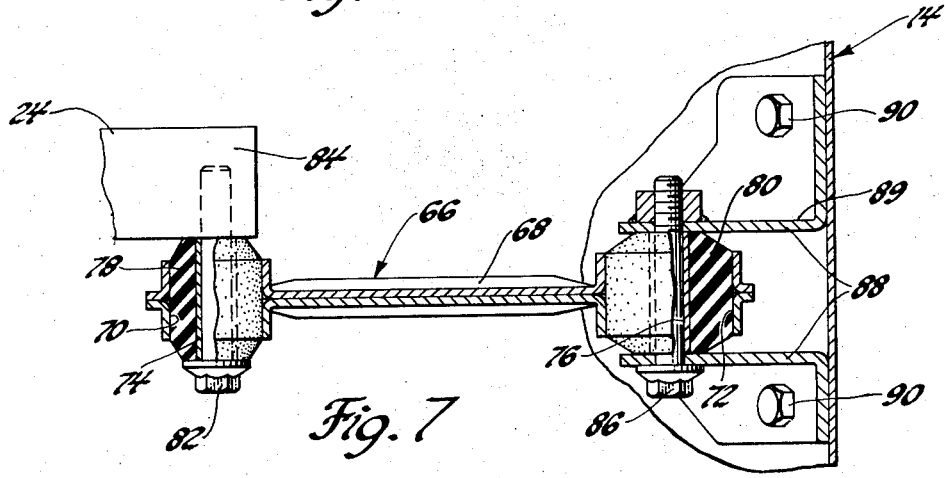

ROTARY ENGINE AND TRANSMISSION ASSEMBLY MOUNTING SYSTEM

The present invention relates to a rotary engine and transmission assembly mounting system and more particularly to such a system having a set of elastomeric mounts for controlling movement in all directions and another elastomeric mount that need control movement in only certain directions.

It is common practice in present day automotive vehicles with reciprocating piston engines to provide a three-point mounting system wherein there are two laterally spaced mounts at the front of the engine and transmission assembly and a single mount at the rear. Typically, the pair of front mounts are secured to opposite sides of the engine and the rear mount is secured to the bottom of the transmission with the mounts selected and arranged to best absorb the engine and transmission assembly vibrations and provide isolation between the vehicle structure and this assembly. With such an arrangement it is possible to uncouple most, if not all, principal rigid body vibration modes of the assembly. This is desirable since with the separation of the different vibratory modes, it is then possible to orient these modes to correspond to the vehicle global axes which allows tuning each mode to a particular shake condition so that the maximum energy of that mode can be brought to bear upon the shake condition. However, in the case of the rotary engine and where the accommodating space in the vehicle structure leaves little clearance, it may not be possible to employ the conventional three-point mounting system. For example, in a typical rotary engine layout with the central axis extending longitudinally of the vehicle like in a reciprocating piston engine arrangement, the rotary engine may not have sufficient space as a reciprocating piston engine has for attachment of the front engine mounts to either side thereof, one of these locations being instead occupied by such equipment as a hot emission control device and an exhaust manifold whose heat can adversely effect an elastomeric mount. We have found that while a rotary engine may present such problems in attempting to use the conventional three-point mounting system, it does lend itself to a different arrangement which basically changes the locations of what are described as the two front mounts for reciprocating piston engines without changing the locations of the rear mount, yet all the advantages of the conventional three-point system are retained, and in addition, certain additional advantages result.

In an actual embodiment of the rotary engine and transmission assembly mounting system according to the present invention, the vehicle structure is provided with a front support that extends transversely under the engine and a rear support that extends transversely under the transmission. A front elastomeric mount is located between and secured to the front support and the engine so as to provide three orthogonal lines of action parallel to the orthogonal yaw-vertical, pitch-lateral and roll-fore-aft axes through the center of gravity of the rotary engine and transmission assembly. A rear elastomeric mount is located between and secured to the rear support and the transmission to provide three orthogonal lines of action that are also parallel to these axes. The front and rear elastomeric mounts are located on opposite sides of the center of gravity and are spaced along but not on the pitch axis and resiliently resist vertical, lateral, and fore-aft movements and also yaw, pitch and roll of the engine and transmission. In addition, there is provided another elastomeric mount that includes a strut. The latter mount which will be referred to as the top mount is located between and secured to the engine and the vehicle structure in a top side location so as to provide a lateral line of action between the front mount and the center of gravity to resiliently resist only lateral movement, yaw and roll of the engine and transmission. With this arrangement it is then possible to provide the mounts with spring constants and line of action distances from the center of gravity so that on movement of the engine and transmission the lateral movement is uncoupled from roll, yaw is uncoupled from lateral movement, pitch is uncoupled from vertical movement and roll is uncoupled from yaw. It is also possible with this arrangement to couple certain modes in order to dissipate vibrational energy through as many modes as possible with the intent being to maintain vibration of all modes below some threshold of sensitivity.

Among the advantages and features of the mounting system according to the present invention, are that rigid body motion of the engine and transmission may be either coupled or uncoupled and that the front and rear mounts are underneath and completely support the engine and transmission weight so that the compression mode of these mounts can be used to support all the weight while their sheer mode is used to absorb engine torque. In addition, the front and rear mounts may be conveniently moved fore-and-aft to take advantage of the well-known nodal point mounting theory wherein by placing the mounts at the rigid body's bending nodal points, it is possible to effectively reduce the engine vibration transmitted to the vehicle and without the front mount being required to have a line of action directed at the center of percussion of the assembly. Another advantage is that the rear mount does not necessarily have to be located on the roll axis since this location may be controlled with both the front mount and the top mount. In addition, in the present arrangement the front mount and the top mount are removed from high temperature sources such as a hot emission control system and exhaust manifold to insure their durability without sacrificing engine vibration isolation.

An object of the present invention is to provide a new and improved rotary engine and transmission assembly mounting system.

Another object is to provide in a rotary engine and transmission assembly mounting system a three-point elastomeric mount arrangement wherein two of the mounts completely support the engine and transmission weight and resiliently resist vertical, lateral, and fore-aft movements and also yaw, pitch and roll, and the third mount is arranged to resiliently resist only lateral movement, yaw, and roll.

Another object is to provide in a rotary engine and transmission assembly mounting system a pair of elastomeric mounts which completely support the engine and transmission weight and also resiliently resist vertical, lateral, and fore-aft movements and also yaw, pitch and roll, and an additional elastomeric mount that resiliently resists only lateral movement, yaw and roll with all of the mounts having spring constants and line of action distances from the center of gravity of the assembly that are conveniently adjusted to either couple or uncouple the different movements.

Another object is to provide in a rotary engine and transmission assembly mounting system an elastomeric mount secured to the bottom of the engine and another elastomeric mount secured to the bottom of the transmission with both these mounts arranged so as to resiliently resist vertical, lateral, and fore-aft movements and also yaw, pitch and roll of the engine and transmission and an additional elastomeric mount secured to the engine so as to resiliently resist only lateral movement, yaw and roll of the engine and transmission.

These and other advantages, features and objects of the present invention will become more apparent from the following description and drawing in which:

FIG. 4 is an enlarged front elevational view of the mounting system's front mount arrangement.

FIG. 5 is a view of the front mount arrangement taken along the line 5—5 in FIG. 4.

FIG. 6 is an enlarged front elevational view of the mounting system's top mount arrangement.

FIG. 7 is an enlarged view of the top mount arrangement taken along the line 7—7 in FIG. 6.

Figure 1:
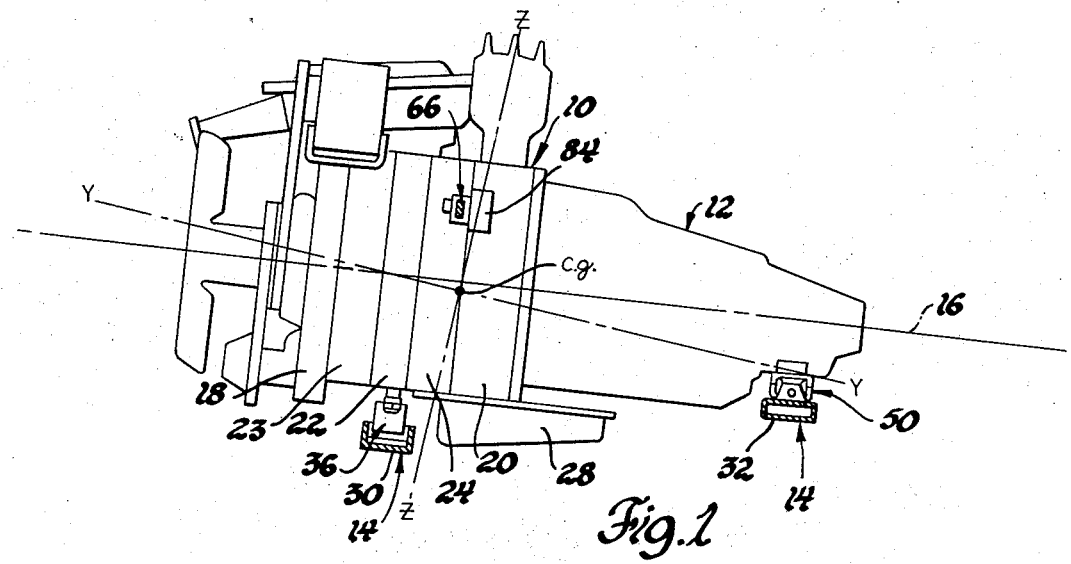
FIG. 1 is a side elevational view of a rotary engine and transmission assembly mounted in a vehicle with a mounting system according to the present invention.
Figure 2:
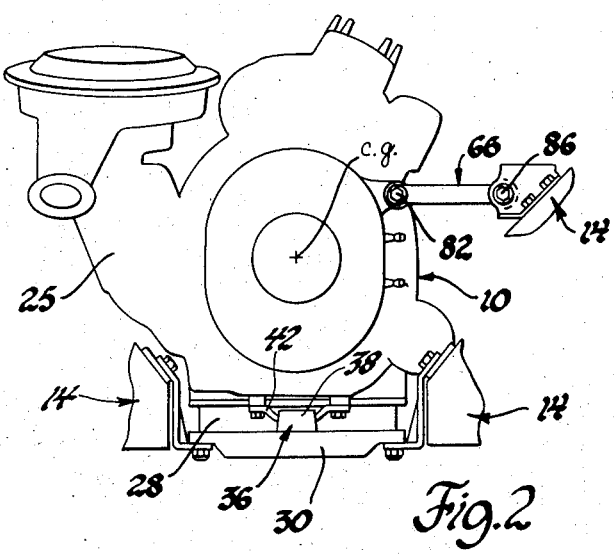
FIG. 2 is a front elevational view of the mounting system in FIG. 1.
Figure 3:
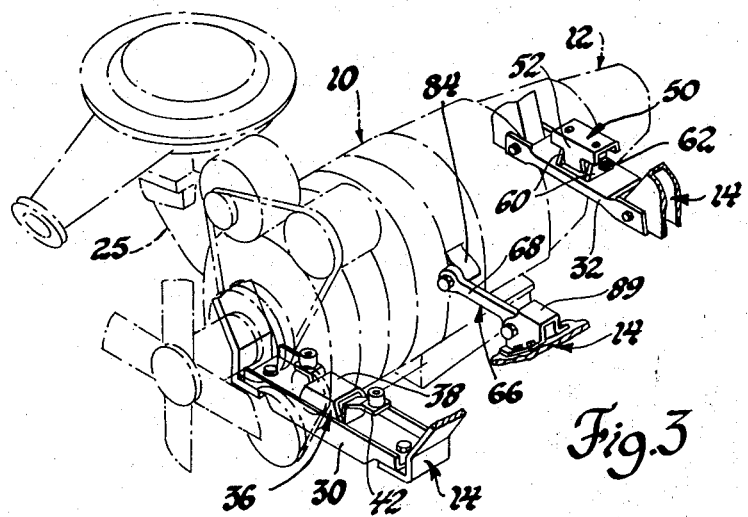
FIG. 3 is a perspective view of the mounting system in FIG. 1.

The mounting system according to the present invention is readily suited to mounting a rotary engine 10 and transmission 12 as a rigid body assembly in an automotive vehicle structure 14 as shown in FIGS. 1, 2 and 3. The rotary engine and transmission assembly has a central axis 16 that extends longitudinally of the vehicle 14 and is angled upward at the front of the engine as best shown in FIG. 1. The transmission 12 may be of the manual or automatic type while the rotary engine illustrated is of the presently commercial planetary rotor type and has two rotors. The engine generally comprises a front housing 18, a rear housing 20, an intermediate housing 22, a front rotor housing 23 between the front housing and intermediate housing, and a rear rotor housing 24 between the intermediate housing and rear housing with the rotors located within the respective rotor housings and the transmission 12 secured to the rear of the rear housing. Instead of an oil pan secured to the bottom of the engine along its length as in a reciprocating engine, the rotary engine has an oil tank 28 that is secured to the bottom of the rear housing 20 and extends rearwardly out under the transmission as shown in FIG. 1. The oil tank 28 extends forwardly only a small distance past the rear interface of the rear rotor housing 24, thus leaving the bottom of the engine forward of this point available for direct rigid attachment thereto which is taken advantage of as will be described in more detail later. In addition, the engine has, as shown in outline, an exhaust manifold and hot emission control device 25 on the vehicle's right-hand side. In an actual rotary engine and transmission assembly of this type, the center of gravity (c.g.) of this rigid body was found to be located in the rear rotor housing 24 as shown at 28 in FIG. 1. During operation of the vehicle, the engine 10 and connected transmission 12 can vibrate in six different modes; namely, vertical, lateral, fore-aft, yaw, pitch and roll. These modes are shown in the analytical model in FIG. 9 wherein the orthogonal, yaw-vertical, pitch-lateral and roll-fore-aft axes and directions pass through the c.g., and the roll axis coinciding with the rigid body's minimum principal axis which is that axis about which the body wants to rotate as the result of torque reaction from engine operation when suspended by the mounting system.

Figure 8:
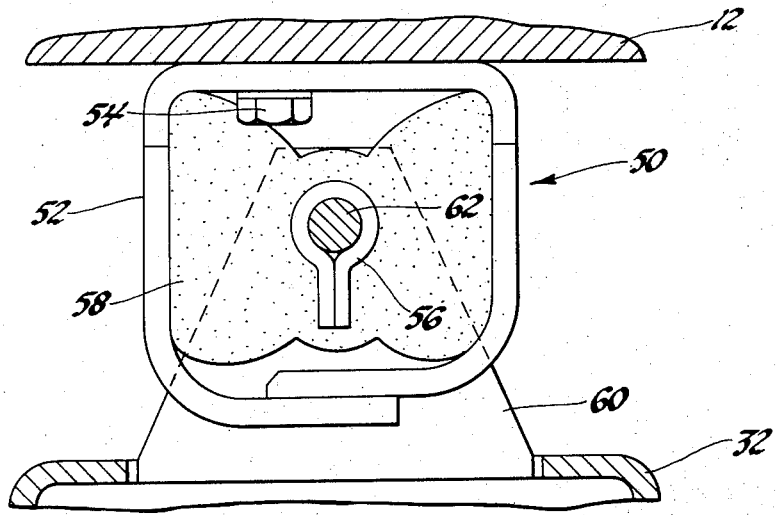
FIG. 8 is an enlarged cross-sectional view of the mounting system's rear mount.

In the mounting system according to the present invention, the vehicle structure 14 has a front lateral support 30 extending transversely under the engine forward of the oil tank 28 and a rear lateral support 32 extending transversely under the transmission. As best shown in FIGS. 3, 4 and 8, the supports 30 and 32 are stiff elongated channels of stamped sheet metal construction and rest on and are bolted at opposite ends to hangers provided on the frame structure and in addition to providing support for the engine and transmission also serve as cross members of the vehicle structure. An elastomeric mount 36 is located between and secured to the front support 30 and the bottom of the engine 10 at the intermediate housing 22 remote from the engine's hot zone. As best shown in FIGS. 4 and 5, the front mount 36 comprises a stamped sheet metal sleeve 38 which is secured at its base by bolts 40 to the top of the front support 30. A stiff engine mounting bracket 42 extends through the laterally extending sleeve 38 and is secured at its opposite end by bolts 44 to bosses 46 that extend downwardly from the bottom of the intermediate housing 22 as best shown in FIGS. 1 and 4. An elastomeric body 48 is bonded between the base of the sleeve 38 and the bottom side of the bracket 42 and thus supports the major portion of the weight of the engine and transmission in compression recognizing the closeness of the c.g., and has other characteristics which will be described in more detail later.

A rear elastomeric mount 50 is located between and is secured to the top of the rear support 32 and the bottom of the transmission 12 near the latter's rear end as shown in FIG. 1. The rear mount 50, as best shown in FIG. 8, comprises a stamped sheet metal sleeve 52 which is secured by bolts 54 to the transmission 12. A bushing 56 is located centrally in the laterally extending sleeve 52 and an elastomeric body 58 is molded in compression between the sleeve and bushing on their fore and aft sides. The bushing 56 aligns with apertures in a pair of upstanding arms 60 welded to the top side of the rear support 32 and a bolt 62 extends through the apertures in these arms and the bushing and is retained by a nut. The elastomeric body 58 thus supports the small remaining weight of the engine and transmission at this end in shear and has other characteristics which will be described in more detail later.

A third elastomeric mount 66 completes the mounting system and as best shown in FIGS. 6 and 7 comprises a strut 68 of stamped sheet metal construction having fore-aft extending apertures 70 and 72 at its opposite ends receiving bushings 74 and 76, respectively, with annular elastomeric bodies 78 and 80 molded in compression between the bushings and the strut. The strut 68 is arranged to extend laterally between the relatively cold side of the engine and the vehicle structure and at its engine end receives a bolt 82 in bushing 74. The bolt 82 which extends longitudinally of the vehicle is threaded to an ear 84 projecting from near the top of the rear rotor housing 24. The strut 68 at the other end has a bolt 86 also extending longitudinally of the vehicle that passes through bushing 76 and aligned apertures in anchor arms 88 of a bracket 89 which is secured by bolts 90 to the vehicle structure, the bolt 86 being threaded to a nut that is welded to one of the bracket arms. The strut 68 is arranged so that with engine roll the strut is placed in either compression or tension and the elastomeric bodies 78 and 80 resiliently resist only lateral movement, yaw and roll of the engine and transmission as will be described in more detail later.

Thus, the engine and transmission assembly is elastomerically supported at three points with the single lower front mount 36 which is slightly forward of the c.g., and the single rear mount which is remotely rearward of the c.g., supporting the full weight of this assembly also being in a position to resiliently resist in addition to the vertical movement, lateral and fore-aft movements and also yaw, pitch and roll. At the third point of the system, the lateral top strut mount 66 is in a position to resiliently resist only lateral movement, yaw and roll. These three elastomeric mounts which are all remote from the engine's hot zone are capable of cooperating to provide uncoupled vibratory modes in most if not all directions of rigid body motion as will now be demonstrated.

Figure 9:
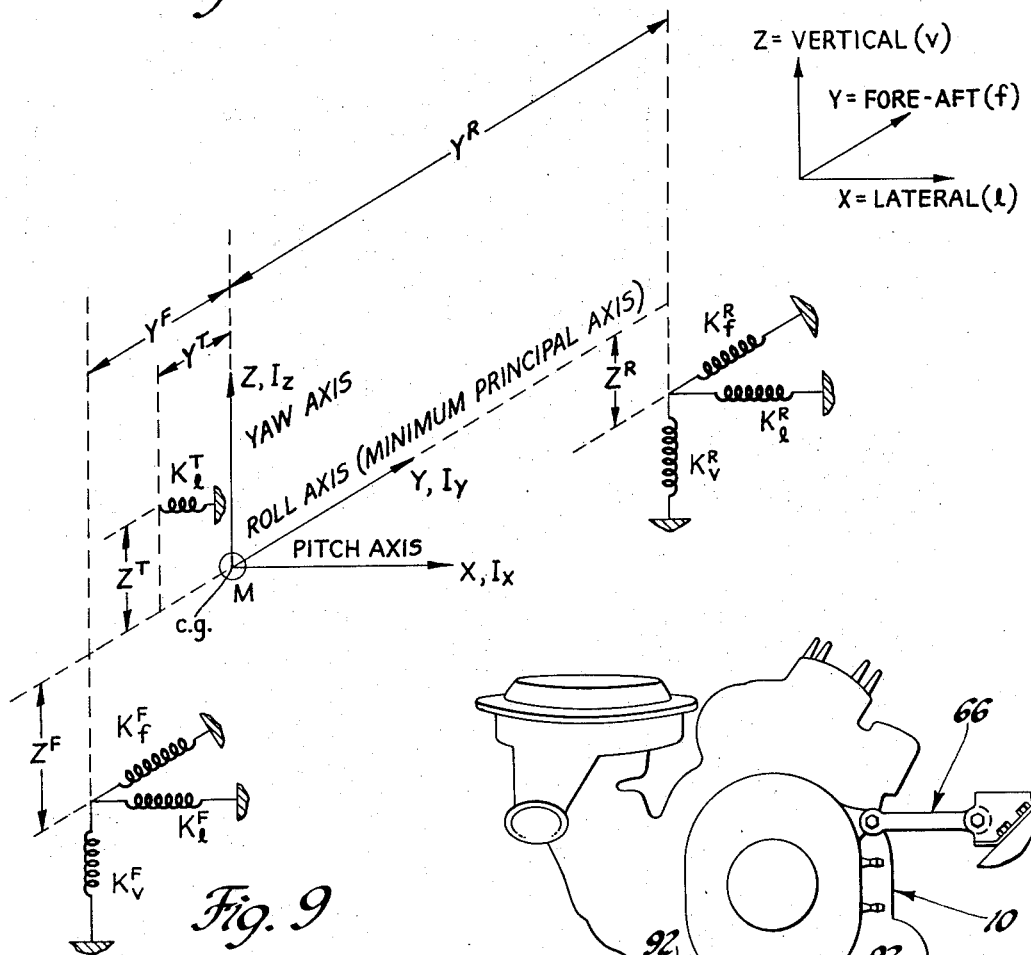
FIG. 9 is an analytical model of the mounting system according to the present invention.

To demonstrate that the mounting system is readily capable of providing for uncoupling rigid body motions in most if not all of the modes in the particular cramped environment illustrated in the drawings, reference is made to FIG. 9 which shows an analytical model of the particular system shown. In the analytical model, positive directions are defined by an axis system X, Y, Z, where the axes are orthogonal with the Y axis set as the roll or minimum principal axis, the superscripts refer to the particular mount, and the subscripts refer to direction. K is spring rate, X, Y, Z are distances, M is mass, I is inertia, $\Delta$ is displacement, $\theta$ is rotation, $\omega$ is frequency and $v, f, l$ are the respective vertical, fore-aft and lateral lines of action of the mounts.

To uncouple the various modes of rigid body motion of the engine and transmission assembly, the following steps are taken:
1. Displace (or rotate) the c.g. in one direction
2. Sum the torques generated by this displacement
3. Set the sum equal to zero.

For example, to uncouple lateral motion from roll motion, the body is displaced laterally ($\Delta_1$), and the roll torque is summed and set equal to zero.

$$(\Delta_1 K_1^F)Z^F + (\Delta_1 K_1^R)Z^R + (\Delta_1 K_1^T)Z^T = 0 \quad 1.$$

where, $(\Delta_1 K_1^F)$ = lateral force at front mount 36
$Z^F$ = moment arm of front mount
$(\Delta_1 K_1^R)$ = lateral force at rear mount 50
$Z^R$ = moment arm at rear mount
$(\Delta_1 K_1^T)$ = lateral force at top mount 66
$Z^T$ = moment arm at top mount Equation (1) can be rewritten as $$\Delta_1 [Z^F K_1^F + Z^R K_1^R + Z^T K_1^T] = 0 \quad 2.$$

and thus $$Z^F K_1^F + Z^R K_1^R + Z^T K_1^T = 0 \quad 3.$$

When equation (3) is satisfied, lateral movement and roll will be uncoupled. To uncouple yaw and lateral movement, yaw torque due to lateral displacement is set equal to zero.

$$(\Delta_1 K_1^F)Y^F + (\Delta_1 K_1^R)Y^R + (\Delta_1 K_1^T)Y^T = 0 \quad 4.$$

which can be reduced to $$Y^F K_1^F + Y^R K_1^R + Y^T K_1^T = 0 \quad 5.$$

To uncouple pitch from vertical movement, pitch torque due to vertical displacement is set equal to zero.

$$(\Delta_v K_v^F)Y^F + (\Delta_v K_v^R)Y^R = 0 \quad 6.$$

which can be reduced to $$Y^F K_v^F + Y^R K_v^R = 0 \quad 7.$$

To uncouple roll from yaw, roll torque due to yaw rotation is set equal to zero.

$$[(\theta_z Y^F)K_1^F]Z^F + [(\theta_z Y^R)K_1^R]Z^R + [(\theta_z Y^T)(K_1^T]Z^T = 0$$

where,
$\theta_z$ = yaw rotation
$(\theta_z Y^F)$ = lateral displacement at front mount 36 due to yaw rotation
$[(\theta_z Y^F)K_1^F]$ = lateral force at front mount due to yaw rotation
$Z^F$ = roll axis moment arm of front mount
$[(\theta_z Y^F)K_1^F]Z^F$ = roll torque exerted by front mount due to a yaw rotation
$(\theta_z Y^R)$ = lateral displacement at rear mount 50 due to yaw rotation
$(\theta_z Y^R)K_1^R]$ = lateral force at rear mount due to yaw rotation
$Z^R$ = roll axis moment arm of rear mount
$[(\theta_z Y^R)K_1^R]Z^R$ = roll torque exerted by rear mount due to a yaw rotation
$(\theta_z Y^T)$ = lateral displacement at front mount due to yaw rotation
$[(\theta_z Y^T)K_1^T]$ = lateral force at top mount 66 due to yaw rotation
$Z^T$ = roll axis moment arm of top mount
$[(\theta_z Y^T)K_1^T]Z^T$ = roll torque exerted by top mount due to a yaw rotation Equation (8) can be reduced to $$Y^F Z^F K_1^F + Y^R Z^R K_1^R + Y^T Z^T K_1^T = 0 \quad 9.$$

To uncouple pitch from fore-aft movement, pitch torque due to fore-aft displacement is set equal to zero.

$$(\Delta_f K_f^F)Z^F + (\Delta_f K_f^R)Z^R = 0 \quad 10.$$

which can be reduced to $$Z^F K_f^F + Z^R K_f^R = 0 \quad (11)$$

The general equation for the natural frequency of a simple spring mass system is $\omega^2 = K/M$ The natural frequencies for the six modes appear below:

$$\text{Lateral } \omega_x^2 = K_1^F + K_1^R + K_1^T/M \quad (12)$$

$$\text{Fore-aft } \omega_Y^2 = (a+b/2) - \sqrt{(a+b)^2/4 - 2b + c} \quad (13)$$

$$\text{Vertical } \omega_Z^2 = K_v^F + K_v^R/M \quad (14)$$

$$\text{Pitch } \omega_{XX}^2 = (a+b/2) + \sqrt{(a+b)^2/4 - 2b + c} \quad (15)$$

$$\text{Roll } \omega_{YY}^2 = [(Z^F)^2 K_1^F + (Z^R)^2 K_1^R + (Z^T)^2 K_1^T / I_Y] \quad (16)$$

$$\text{Yaw } \omega_{ZZ}^2 = [(Y^F)^2 K_1^F + (Y^R)^2 K_1^R + (Y^T)^2 K_1^T / I_Z] \quad (17)$$

where:

$$a = [(Z^F)^2 K_f^F + (Y^F)^2 K_v^R + (Z^R)^2 K_f^R + (Y^R)^2 K_v^R / I_X] \quad (18)$$

$$b = K_f^F + K_f^R/M \quad (19)$$

$$c = (Z^F K_f^F + Z^R K_f^R)^2 / M I_X \quad (20)$$

In the particular actual arrangement referred to previously, it was found to be impossible to satisfy equation (11) to uncouple pitch and fore-aft. Therefore, equations (13) and (15) for fore-aft and pitch are related by eigen values (18), (19) and (20) of the general stiffness equations.

In total there are 23 parameters ($K_v^F$, $K_f^F$, $K_1^F$, $Z^F$, $Y^F$, $K_1^T$, $Z^T$, $Y^T$, $M$, $I_X$, $I_Y$, $I_Z$, $K_v^R$, $K_f^R$, $K_1^R$, $Z^R$, $Y^R$, $\omega_X$, $\omega_Y$, $\omega_Z$, $\omega_{XX}$, $\omega_{YY}$, $\omega_{ZZ}$). In addition there are 11 general equations, 10 of which may be satisfied. Therefore, by selecting 13 of the 23 parameters, it is possible to solve for any of the other 10.

In the particular actual arrangement, the rotary engine and transmission were to be installed in an existing production vehicle structure that normally received a reciprocating piston engine and similar transmission; and as a result, there were a number of physical considerations that were made before unique solutions were attempted for the general equations. These considerations were:

1. Desirability of not changing the existing transmission mounting surface (fixed $Y^R$)
2. Forced location of front and top mount due to space availability (fixed $Z^F$, $Y^F$, $Z^T$, $Y^T$)
3. Inherent mass characteristics of the engine and transmission assembly. (weight and inertia) (fixed $M$, $I_X$, $I_Y$, $I_Z$)
4. Since pitch and fore-aft would be coupled, the fore-aft rates of the mounts could be fixed ($K_f^F$, $K_f^R$)
5. Recognizing roll and vertical are the most important modes, the equations can be forced to be solved in terms of roll and vertical frequencies (fixed $\omega_{YY}$, $\omega_Z$) With these considerations in mind, the general equations can be solved specifically; that is, given $K_f^F$, $Z^F$, $Y^F$, $Z^T$, $Y^T$, $M$, $I_X$, $I_Y$, $I_Z$, $K_f^R$, $Y^R$, $\omega_{YY}$, and $\omega_Z$, the general equations are solved for $K_v^F$, $K_1^F$, $K_1^T$, $K_v^R$, $K_1^R$, $Z^R$, $\omega_X$, $\omega_{ZZ}$, $\omega_Y$, and $\omega_{XX}$.

Following is a listing of the specific design equations:

$$K_v^R = M\omega_Z^2/[1 - (Y^R/Y^F)] \quad (21)$$

$$K_v^F = M\omega_Z^2/1 - Y^F/Z^R \quad (22)$$

$$Z^R = [(Y^F - Y^T) Z^F Y^R Z^T / Y^F Z^F Y^T + Y^F Y^R Z^T - Z^F Y^R Y^T - Y^F Y^T Z^T] \quad (23)$$

$$K_1^T = I_Y \omega_{YY}^2 / [\alpha (Z^F)^2 + \beta (Y^R)^2 + (Z^T)^2] \quad (24)$$

$$K_1^R = \beta K_1^T \quad (25)$$

$$K_1^F = \alpha K_1^T \quad (26)$$

$$\omega_X^2 = [(\alpha + \beta + 1) K_1^T]/M \quad (27)$$

$$\omega_{ZZ}^2 = [\alpha(Y^F)^2 + \beta(Y^R)^2 + (Y^T)^2] K_1^T / I_Z \quad (28)$$

$$\omega_Y^2 = (a+b/2) - \sqrt{(a+b)^2/4 - ab + c} \quad (29)$$

$$\omega_{XX}^2 = (a+b/2) + \sqrt{(a+b)^2/4 - ab + c} \quad (30)$$

where, $$\beta = (Y^F Z^T - Z^F Y^T)/(Z^F Y^R - Y^F Z^R) \quad (31)$$

and $$\alpha = -(Z^R/Z^F)\beta - (Y^T/Z^F)$$

32.

It is then a simple matter to perform the calculations of these design equations with a computer program. The analytical model and relative arrangement of the mounts depicts computed results from the above equations wherein with the front mount 36 secured to the bottom of the intermediate housing 22 close to and in front of the c.g., the top mount 66 secured to the rear rotor housing 24 near the top and also close to and forward of the c.g., and the rear mount 50 in a conventional location far rearward of the c.g., all but the pitch and fore-aft modes are actually uncoupled. This has thus been accomplished with both the lower front and rear mounts 36 and 50 providing three orthogonal lines of action parallel to the XYZ axes and directions at locations on opposite sides of the center of gravity to resiliently resist vertical, lateral, fore-aft movements, and also yaw, pitch and roll and with these mounts also supporting all of the weight of the engine and transmission while the top mount 66 provides only a lateral line of action located between the front mount and the center of gravity to resiliently resist only lateral movement, yaw and roll. Furthermore, the above equations show that these mounts with the proper spring constants and line of action distances from the center of gravity can provide selective coupling and uncoupling of the vibratory modes to obtain the best vibration isolation in a given vehicle.

Furthermore, it is known to be desirable from a protective shipping standpoint to transport assembled vehicles in vertical positions on railroad cars with the front pointed down and with the result that the engine's mount system must then support the weight of the engine and transmission in this vertical position. The present mounting system is readily suited to providing such support wherein the front and rear lower mounts will continue to support the weight of the engine and transmission in the transport position recognizing that the elastomeric body 58 in the rear mount 50 would then take the major portion of this weight in compression while the resilient body 48 in the front mount 36 resisted in shear.

Figure 10:
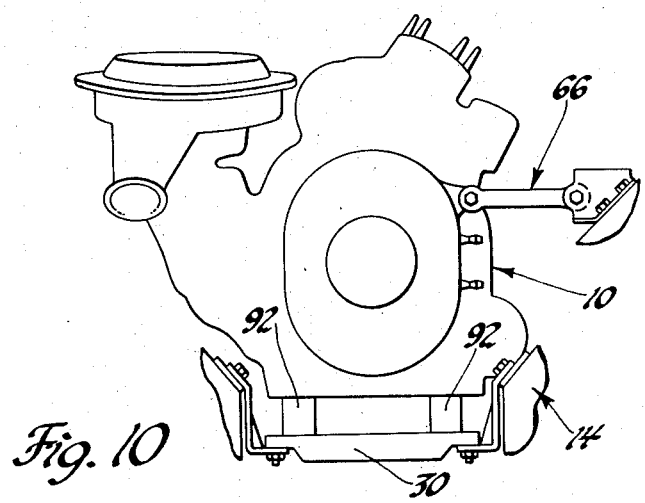
FIG. 10 is a view similar to FIG. 2 showing another embodiment of the mounting system according to the present invention wherein the front mount is divided into two separate mounts with the other mounts retained without change.

It will also be understood that given the concept of the mounting system according to the present invention as described above, the lower front mount may be split into two separate laterally spaced but uninclined mounts 92 between the intermediate housing 22 and the front support 30 as shown in FIG. 10 with their separate lines of action in the same direction as when the single mount is provided. This can be advantageous in a particular installation to provide easier access to the front mount arrangement.

The above described embodiment is illustrative of the invention which may be modified within the scope of the appended claims.

We claim:

1. A rotary engine, a transmission fixed to said engine, said engine and said transmission combined having a center of gravity located in said engine with orthogonal yaw-vertical, pitch-lateral and roll-fore-aft axes through said center of gravity, a vehicle structure having a front support extending transversely under said engine, a rear support extending transversely under said transmission, front elastomeric mount means located between and secured to the top of said front support and the bottom of said engine so as to provide three orthogonal lines of action parallel to said axes on one side of said center of gravity for yieldingly resisting vertical, lateral, fore-aft movements and also yaw, pitch and roll of said engine and said transmission, rear elastomeric mount means located between and secured to the top of said rear support and the bottom of said transmission so as to provide three orthogonal lines of action parallel to said axes on the opposite side of said center of gravity for also yieldingly resisting vertical, lateral, fore-aft movements and also yaw, pitch and roll of said engine and said transmission, and additional elastomeric mount means located between and secured to said engine and said vehicle structure so as to provide only a lateral line of action located between said front elastomeric mount means and said center of gravity for yieldingly resisting only lateral movement, yaw and roll of said engine and said transmission.

2. A rotary engine having a front housing, a rear housing, an intermediate housing, a front rotor housing between said front housing and said intermediate housing and a rear rotor housing between said intermediate housing and said rear housing, a transmission fixed to said rear housing, said engine and said transmission combined having a center of gravity with orthogonal yaw-vertical, pitch-lateral and roll-fore-aft axes through said center of gravity, a vehicle structure having a front support extending transversely under said engine, a rear support extending transversely under said transmission, front elastomeric mount means located between and secured to the top of said front support and the bottom of said engine so as to provide three orthogonal lines of action parallel to said axes on one side of said center of gravity for yieldingly resisting vertical, lateral, fore-aft movements and also yaw, pitch and roll of said engine and said transmission, rear elastomeric mount means located between and secured to the top of said rear support and the bottom of said transmission so as to provide three orthogonal lines of action parallel to said axes on the opposite side of said center of gravity for also yieldingly resisting vertical, lateral, fore-aft movements and also yaw, pitch and roll of said engine and said transmission, and additional elastomeric mount means located between and secured to said engine and said vehicle structure so as to provide only a lateral line of action located between said front elastomeric mount means and said center of gravity for yieldingly resisting only lateral movement, yaw and roll of said engine and said transmission.

3. A rotary engine having a front housing, a rear housing, an intermediate housing, a front rotor housing between said front housing and said intermediate housing and a rear rotor housing between said intermediate housing and said rear housing, a transmission fixed to said rear housing, said engine and said transmission combined having a center of gravity located in said rear rotor housing with orthogonal yaw-vertical, pitch-lateral and roll-fore-aft axes through said center of gravity, a vehicle structure having a front support extending transversely under said intermediate housing, a rear support extending transversely under said transmission, front elastomeric mount means located between and secured to the top of said front support and the bottom of said intermediate housing so as to provide three orthogonal lines of action parallel to said axes on one side of said center of gravity for yieldingly resisting vertical, lateral, fore-aft movements and also yaw, pitch and roll of said engine and said transmission, rear elastomeric mount means located between and secured to the top of said rear support and the bottom of said transmission so as to provide three orthogonal lines of action parallel to said axes on the opposite side of said center of gravity for also yieldingly resisting vertical, lateral, fore-aft movements and also yaw, pitch and roll of said engine and said transmission, and additional elastomeric mount means including a strut located between and secured to said rear housing and said vehicle structure so as to provide only a lateral line of action located between said front elastomeric mount means and said center of gravity for yieldingly resisting only lateral movement, yaw and roll of said engine and said transmission.

4. A rotary engine having a front housing, a rear housing, an intermediate housing, a front rotor housing between said front housing and said intermediate housing and a rear rotor housing between said intermediate housing and said rear housing, a transmission fixed to said rear housing, said engine and said transmission combined having a center of gravity located in said rear rotor housing with orthogonal yaw-vertical, pitch-lateral and roll-fore-aft axes through said center of gravity, a vehicle structure having a front support extending transversely under said intermediate housing, a rear support extending transversely under said transmission, front elastomeric mount means located between and secured to the top of said front support and the bottom of said intermediate housing so as to provide three orthogonal lines of action parallel to said axes on one side of said center of gravity for yieldingly resisting vertical, lateral, fore-aft movements and also yaw, pitch and roll of said engine and said transmission, rear elastomeric mount means located between and secured to the top of said rear support and the bottom of said transmission so as to provide three orthogonal lines of action parallel to said axes on the opposite side of said center of gravity for also yieldingly resisting vertical, lateral, fore-aft movements and also yaw, pitch and roll of said engine and said transmission, additional elastomeric mount means including a strut located between and secured to said rear housing and said vehicle structure so as to provide only a lateral line of action located between said front elastomeric mount means and said center of gravity for yieldingly resisting only lateral movement, yaw and roll of said engine and said transmission, and all said elastomeric mount means having spring constants and line of action distances from said center of gravity so that on movement of said engine and said transmission the lateral movement is uncoupled from roll, yaw is uncoupled from lateral movement, pitch is uncoupled from vertical movement and roll is uncoupled from yaw.

* * * * *

PO-1050
(5/69)

UNITED STATES PATENT OFFICE
CERTIFICATE OF CORRECTION

Patent No. 3,825,090                Dated July 23, 1974

Inventor(s) Donald L. Runkle, Charles N. Hughes

It is certified that error appears in the above-identified patent and that said Letters Patent are hereby corrected as shown below:

Column 6, Equation 8, the equation should be corrected so that the numerals "0" and "8" are not printed on top of each other.

Column 7, line 5, "The" should begin a new sentence; equation 12 should read -- Lateral $\omega_X^2 = (K_1^F + K_1^R + K_1^T)/M$ --; equation 13 should read -- Fore-aft $\omega_Y 2 = (a+b)/2 - \sqrt{(a+b)^2/4 - 2b+c}$ --;

equation 14 should read -- Vertical $\omega_Z^2 = (K_v^F + K_v^R)/M$ --;

equation 15 should read -- Pitch $\omega_{XX}^2 = \sqrt{(a+b)/2 + (a+b)^2/4 - 2b+c}$ equation 16 should read --
$$\text{Roll } \omega_{YY}^2 = [(Z^F)^2 K_1^F + (Z^R)^2 K_1^R + (Z^T)^2 K_1^T]/I_Y \quad --;$$

equation 17 should read --
$$\text{Yaw } \omega_{ZZ}^2 = [(Y^F)^2 K_1^F + (Y^R)^2 K_1^R + (Y^T)^2 K_1^T]/I_Z \quad --;$$

equation 18 should read --
$$a = [(Z^F)^2 K_f^F + (Y^F)^2 K_v^R + (Z^R)^2 K_f^R + (Y^R)^2 K_v^R]/I_X \quad --;$$

UNITED STATES PATENT OFFICE
CERTIFICATE OF CORRECTION

Patent No. 3,825,090          Dated July 23, 1974

Inventor(s) Donald L. Runkle, Charles N. Hughes

It is certified that error appears in the above-identified patent and that said Letters Patent are hereby corrected as shown below:

(Page 2) Column 7 continued-- equation 19 should read -- $b = (K_f^F + K_f^R)/M$ --.

Column 8, equation 22 should read -- $K_v^F = M\omega_z^2/(1 - Y^F/Z^R)$ --;

equation 23 should read --

$$Z^R = (Y^F - Y^T)Z^F Y^R Z^T/(Y^F Z^F Y^T + Y^F Y^R Z^T - Z^F Y^R Y^T - Y^F Y^T Z^T)$$ --;

equation 29 should read --

$$\omega Y^2 = (a+b)/2 - \sqrt{(a+b)^2/4 - ab + c}$$ --;

equation 30 should read --

$$\omega XX^2 = (a+b)/2 + \sqrt{(a+b)^2/4 - ab + c}$$ --.

UNITED STATES PATENT OFFICE
CERTIFICATE OF CORRECTION

PO-1050
(5/69)

Patent No. 3,825,090     Dated July 23, 1974

Inventor(s) Donald L. Runkle, Charles N. Hughes

It is certified that error appears in the above-identified patent and that said Letters Patent are hereby corrected as shown below:

Column 6, that portion of Equation 8 reading $$[(\Theta_z Y^T (K_1^T] Z^T = 0$$

should read $$[(\Theta_z Y^T) K_1^T] Z^T = 0 \quad ;$$

line 47, equation $(\Theta_z Y^R) K_1^R] =$ should read $[(\Theta_z Y^R) K_1^R] =$ Signed and sealed this 10th day of December 1974.

(SEAL)
Attest:

McCOY M. GIBSON JR.
Attesting Officer

C. MARSHALL DANN
Commissioner of Patents